(No Model.)
G. E. JOHNSON
CAR BRAKE.
No. 456,958. Patented Aug. 4, 1891.
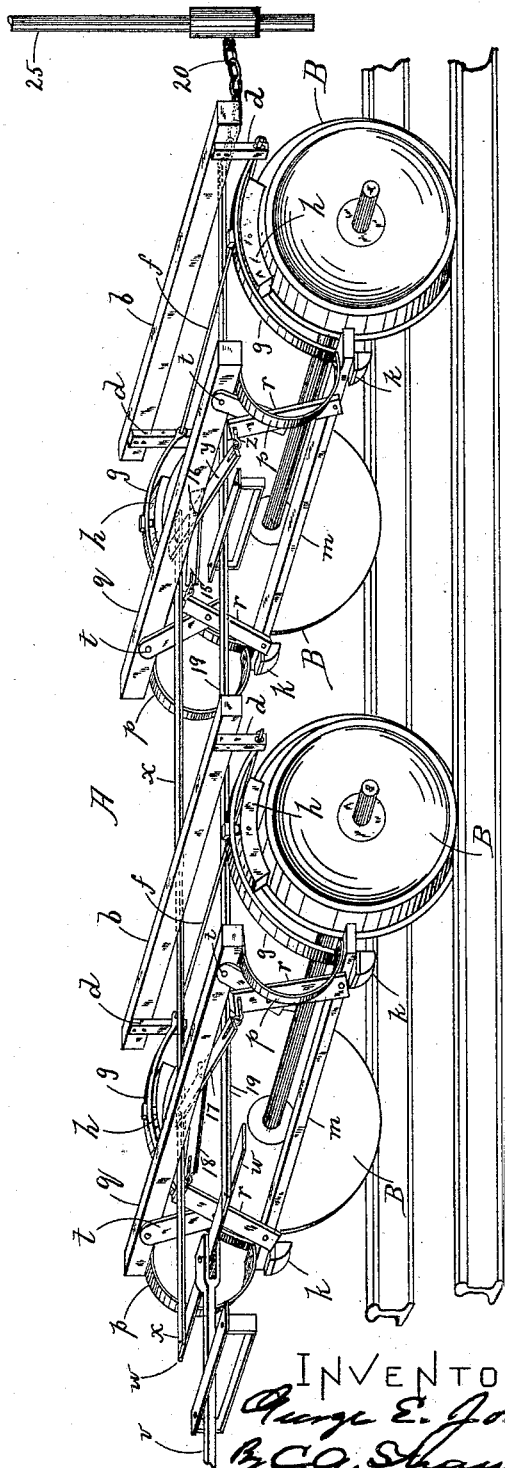
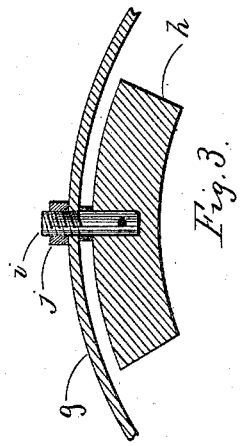
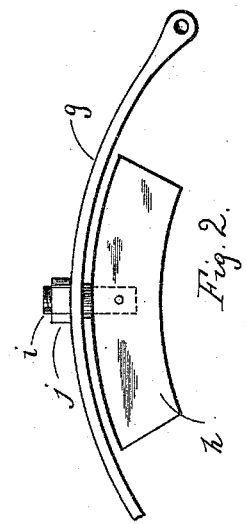

UNITED STATES PATENT OFFICE.

GEORGE E. JOHNSON, OF DANVERS, MASSACHUSETTS.

CAR-BRAKE.

SPECIFICATION forming part of Letters Patent No. 456,958, dated August 4, 1891.

Application filed April 14, 1891. Serial No. 388,890. (No model.)

*To all whom it may concern:*

Be it known that I, GEORGE E. JOHNSON, of Danvers, in the county of Essex, State of Massachusetts, have invented certain new and useful Improvements in Car-Brakes, of which the following is a description sufficiently full, clear, and exact to enable any person skilled in the art or science to which said invention appertains to make and use the same, reference being had to the accompanying drawings, forming part of this specification, in which—

Figure 1 is a perspective view of a car-truck provided with my improved brake apparatus; Fig. 2, a side elevation of one of the brake-shoes, the supports detached, and Fig. 3, a vertical transverse section of the same, illustrating details of construction.

Like letters and figures of reference indicate corresponding parts in the different figures of the drawings.

My invention relates especially to means for mounting and actuating brake-shoes of railway-car brakes; and it consists in certain novel features, hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the truck considered as a whole, said truck being mounted and secured to the car-body in the ordinary manner. Each cross-beam $b$ is provided with hangers $d$, said hangers being respectively connected by rods $f$. At each end of said rods a curved or segmental metallic bar $g$ is pivoted and extends over the top of the wheels B in the same vertical plane therewith. The brake-shoes $h$ are secured to said bars $g$ in such position that they will bear upon the top of the wheels B. The brake-shoes are mounted on the bars $g$ by means of a bolt $i$ and nut $j$. The lower ends of the bars $g$ are each provided with a lug $k$, connected on respective wheel-sets by horizontal beams $m$. A semicircular flat spring $p$, having one end secured to the end of the beam $m$, is arranged vertically thereon. Each set of said springs have their upper ends secured to one of the truck-beams $q$. To each end of each beam $m$ a vertically-arranged bar $r$ is pivoted to swing, and connecting each of said bars with the adjacent beam $q$ there is a pivoted bar $t$. An ordinary brake-connecting rod $v$ has a horizontal bar $w$, pivoted centrally in one end thereof. A bar $x$ has one end pivoted to the bar $w$, and is arranged longitudinally of the truck, its opposite end being pivoted to a bar $y$, connected by a link $z$ with the upper end of one swinging bar $r$ on the forward beam $m$. The companion-bar $r$ is connected by a similar linked bar 15 with said bar $y$, pivoted thereto at 16. The bars $r$ on the inner brake-beam $m$ of the truck are connected in like manner by pivoted bars 17 and 18 with the bar $x$. To the opposite end of the bar $w$ a longitudinally-arranged bar 19 is pivoted and extends to the front of the car, where it is connected by a chain 20 with the ordinary brake-rod 25.

In the use of my improvement, as the brake-rod 25 is rotated, winding the chain 20 thereon, the bar 19 is thrown outward, moving the pivoted bar $w$ and drawing the companion-bar $x$ longitudinally in the opposite direction. This actuates the bars $r$, pivoted to the hangers $t$ on the truck-beam $q$ and causes the brake-beams $m$ to be thrown inward toward the wheels B. The opposite ends of the segmental bars $g$, to which the brake-beams are secured, being pivoted to the hangers $d$, the shoes $h$ are forced by this movement into engagement with the tread of the wheels at the top, vertically above the axle. The springs $p$, rigidly secured to the frame-beams, expand to permit this movement of the bar $g$, and when the brake-rod 25 is released in the ordinary manner said springs $p$ serve to elevate the brake-beams and draw the shoes out of contact with the wheels.

By means of the system of levers employed pivoted rigidly to the truck-beams and connected by levers fulcrumed on the brake-bars great purchase is attained on the shoes with a correspondingly small expenditure of power at the brake-rod 25.

Having thus explained my invention, what I claim is—

1. In a car-brake, brake-shoes pivotally supported from the truck-beams in position to engage the top of the car-wheels, in combination with the brake-beams connected with said shoes, pull-springs connecting said beams with the car-truck, and a series of levers actuated by the brake-rod and arranged to throw said beams inward toward the car-wheels, substantially as described.

2. In a car-brake, the curved bars $g$, provided with the shoes $h$ and pivoted by one end to the truck-frame, in combination with the spring-supported brake-beams secured to the opposite ends of said bars, and mechanism for actuating said beams, substantially as described.

3. In a car-brake, the pivoted bars $g$ and adjustable shoes $h$, in combination with the spring-supported beam $m$, the pivoted brake-bars $x$ 19, and levers connecting said bars and beams, all being arranged to operate substantially as described.

4. In a car-brake, a spring-supported brake-beam, curved bars secured thereto and disposed over the car-wheels, the opposite ends of said bars being pivoted to the truck-frame, adjustable brake-shoes on said bars, the pivoted brake-bars actuated by the car-brake rod, and a series of levers pivoted to the truck and connecting one of said bars with said beam, substantially as described.

5. In a car-brake, the bar $g$, pivoted to the truck-frame and provided with the adjustable shoe $h$, in combination with the brake-beam and actuating mechanism, substantially as described.

6. In a car-brake, a spring-supported brake-beam, a shoe connected thereto and adapted to engage the car-wheels at the top, and actuating mechanism for said beam, substantially as described.

GEORGE E. JOHNSON.

Witnesses:
HENRY M. ELLIOTT,
EDWIN HUMPHREYS.